United States Patent
Nam

(10) Patent No.: US 9,164,635 B2
(45) Date of Patent: Oct. 20, 2015

(54) TOUCH SENSOR CHIP, TOUCH SENSING APPARATUS INCLUDING THE SAME, AND METHOD OF CONTROLLING NOISE OF TOUCH PANEL

(71) Applicant: MELFAS, INC., Seoul (KR)

(72) Inventor: Sung-Sik Nam, Seoul (KR)

(73) Assignee: Melfas Inc., Seoul (KR)

( * ) Notice: Subject to any disclaimer, the term of this patent is extended or adjusted under 35 U.S.C. 154(b) by 52 days.

(21) Appl. No.: 13/888,557

(22) Filed: May 7, 2013

(65) Prior Publication Data

US 2013/0293511 A1 Nov. 7, 2013

(30) Foreign Application Priority Data

May 7, 2012 (KR) .................. 10-2012-0048109
Jul. 2, 2012 (KR) .................. 10-2012-0071754

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
CPC .................................. G06F 3/044; G06F 3/0418
USPC ............. 345/173, 174, 156; 178/18.01, 18.06
See application file for complete search history.

(56) References Cited

U.S. PATENT DOCUMENTS

| | | | |
|---|---|---|---|
| 7,643,011 B2 | 1/2010 | O'Connor et al. | |
| 2008/0157893 A1* | 7/2008 | Krah | 331/177 R |
| 2008/0158169 A1* | 7/2008 | O'Connor et al. | 345/173 |
| 2008/0158180 A1 | 7/2008 | Krah et al. | |
| 2008/0162996 A1* | 7/2008 | Krah et al. | 714/27 |
| 2011/0025634 A1* | 2/2011 | Krah et al. | 345/173 |
| 2011/0063993 A1 | 3/2011 | Wilson et al. | |
| 2012/0105353 A1* | 5/2012 | Brosnan | 345/174 |
| 2013/0176272 A1* | 7/2013 | Cattivelli et al. | 345/174 |
| 2014/0368467 A1* | 12/2014 | Park et al. | 345/174 |

FOREIGN PATENT DOCUMENTS

| | | |
|---|---|---|
| KR | 2008-0081411 | 9/2008 |
| KR | 2011-0061798 | 6/2011 |

* cited by examiner

*Primary Examiner* — Priyank Shah
(74) *Attorney, Agent, or Firm* — Fenwick & West LLP

(57) ABSTRACT

Provided are a touch sensor chip, a touch sensing apparatus including the same, and a method of controlling noise of a touch panel. The touch sensing apparatus includes: an electronic device which is driven by a clock signal; a touch panel which is placed adjacent to the electronic device and receives a touch signal; and a touch sensor chip which transmits a driving signal to the touch panel and hops a frequency of the driving signal by a hopping interval if a noise level at the frequency of the driving signal is equal to or higher than a noise threshold, wherein the hopping interval is set based on an exciting frequency of the touch sensor chip.

23 Claims, 11 Drawing Sheets

TOUCH SENSOR CHIP, TOUCH SENSING APPARATUS INCLUDING THE SAME, AND METHOD OF CONTROLLING NOISE OF TOUCH PANEL

This application claims priority from Korean Patent Applications No. 10-2012-0048109 filed on May 7, 2012 and No. 10-2012-0071754 filed on Jul. 2, 2012 in the Korean Intellectual Property Office, the disclosure of which is incorporated herein by reference in its entirety.

BACKGROUND OF THE INVENTION

1. Field of the Invention

The present invention relates to a touch sensor chip, a touch sensing apparatus including the same, and a method of controlling noise of a touch panel, and more particularly, to a touch sensor chip which varies a driving frequency according to the occurrence of noise, a touch sensing apparatus including the touch sensor chip, and a method of controlling noise of a touch panel.

2. Description of the Related Art

A touch sensing apparatus includes a touch panel and recognizes a user's screen touch or gesture as input information. Touch panels of touch sensing apparatuses are classified into resistive, capacitive, ultrasonic, and infrared touch panels according to their driving method. Of these touch panels, capacitive touch panels are drawing much attention due to ease of multi-touch input.

A capacitive touch sensing apparatus suffers from various types of noise. One of the types of noise is environmental noise caused by the environment around the touch sensing apparatus. The environmental noise denotes noise generated by electromagnetic interference (EMI) or ground (GND) fluctuation that occurs in electronic devices other than the touch sensing apparatus. Generally, a touch panel of a touch sensing apparatus is placed on a display panel which displays images. Therefore, the touch panel may be interfered by a driving signal that drives the display panel as well as by other electronic devices around the touch panel.

If a noise occurs in the touch panel due to the environmental noise, the touch accuracy of the touch panel can be reduced. For this reason, a touch sensing apparatus that can flexibly deal with the environmental noise is required.

SUMMARY OF THE INVENTION

Aspects of the present invention provide a touch sensor chip which can prevent malfunctions caused by noise, a touch sensing apparatus including the touch sensor chip, and a method of controlling noise of a touch panel.

Aspects of the present invention also provide a touch sensor chip which can vary a driving frequency of a touch panel according to a frequency of noise that occurs around the touch panel, a touch sensing apparatus including the touch sensor chip, and a method of controlling noise of the touch panel.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a touch sensing apparatus including: an electronic device which is driven by a clock signal; a touch panel which is placed adjacent to the electronic device and receives a touch signal; and a touch sensor chip which transmits a driving signal to the touch panel and hops a frequency of the driving signal by a hopping interval if a noise level at the frequency of the driving signal is equal to or higher than a noise threshold, wherein the hopping interval is set based on an exciting frequency of the touch sensor chip.

According to another aspect of the present invention, there is provided a touch sensor chip including: a driving signal transmission unit which transmits a driving signal to a touch panel; a touch determination unit which determines the occurrence of a touch and the location of the touch based on a touch signal received from the touch panel; and a noise calculation unit which calculates a noise level at a frequency based on the touch signal; and a frequency hopping unit which hops a frequency of the driving signal if the noise level at the frequency of the driving signal is equal to or higher than a noise threshold, wherein the hopping interval is set based on an exciting frequency of the touch sensor chip.

According to another aspect of the present invention, there is provided a method of controlling noise of a touch panel. The method includes: measuring a noise level at a frequency of a driving signal of a touch panel; and hopping the frequency of the driving signal by a hopping interval which is set based on an exciting frequency of a touch sensor chip if the noise level is equal to or higher than a noise threshold.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

It will be understood that when an element or layer is referred to as being "on" another element or layer, the element or layer can be directly on another element or layer or intervening elements or layers may be present. Like numbers refer to like elements throughout.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the present invention.

Hereinafter, embodiments of the present invention will be described with reference to the attached drawings.

Figure 1:
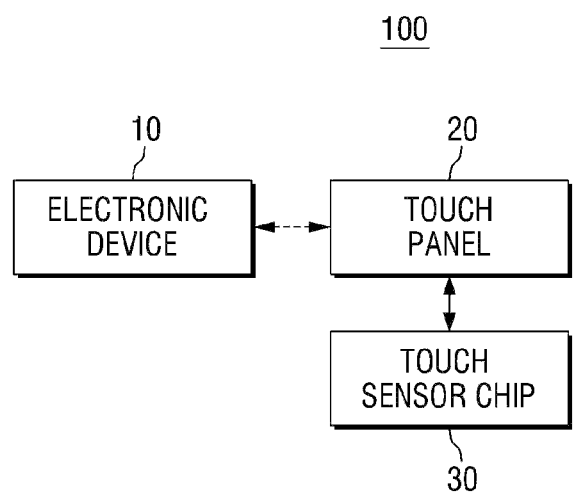
FIG. 1 is a schematic diagram illustrating a touch sensing apparatus according to an embodiment of the present invention.
Figure 2:
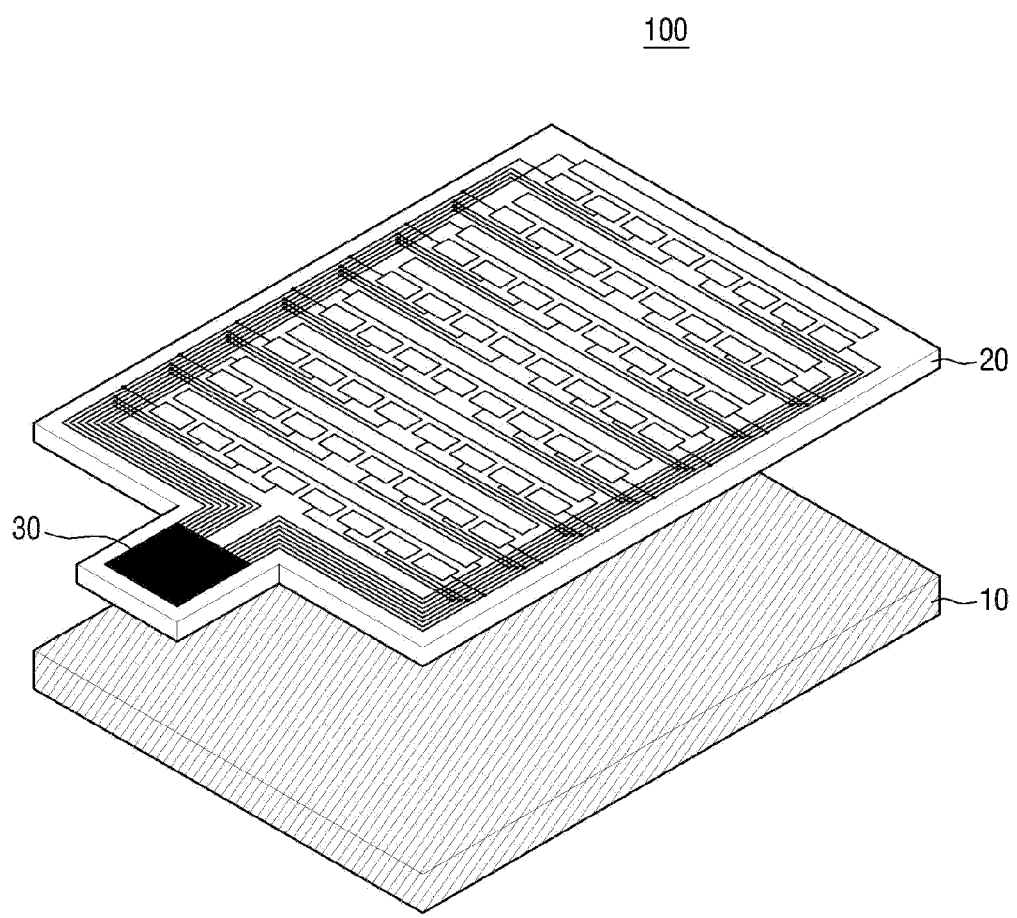
FIG. 2 is an exploded perspective view of the touch sensing apparatus shown in FIG. 1.

FIG. 1 is a schematic diagram illustrating a touch sensing apparatus 100 according to an embodiment of the present invention. FIG. 2 is an exploded perspective view of the touch sensing apparatus 100 shown in FIG. 1. Referring to FIGS. 1 and 2, the touch sensing apparatus 100 includes an electrode device 10, a touch panel 20, and a touch sensor chip 30.

The electronic device 10 is placed around the touch panel 20 and generates an electromagnetic wave in response to a clock signal or a driving signal. Since the touch panel 20 is generally disposed on a display panel which displays images, the electronic device 10 may be the display panel. Alternatively, the electronic device 10 may a voltage supply unit which supplies a voltage to the touch panel 20. Alternatively, the electronic device 10 may be an electronic device which is disposed outside the touch sensing apparatus 100 including the touch panel 20 and generates an electromagnetic wave.

The electronic device 10 may be a display panel. The display panel is a panel that displays images. The display panel may be a liquid crystal display (LCD) panel, an electrophoretic display panel, an organic light-emitting diode (OLED) panel, a light-emitting diode (LED) panel, an inorganic electroluminescent (EL) display panel, a field emission display (FED) panel, a surface-conduction electron-emitter display (SED) panel, a plasma display panel (PDP), or a cathode ray tube (CRT) display panel. The touch panel 20 may be stacked on a surface of the display panel. For ease of description, a case where the electronic device 10 is the display panel will be described herein. However, the present invention is not limited to this case, and it is obvious that all electronic devices which can affect the operation of the touch panel 20 by generating an electromagnetic wave outside the touch panel 20 can be employed.

The display panel may be an LCD panel that is driven by a clock signal. For ease of description, a case where the electronic device 10 is an LCD panel will be described herein. However, the present invention is not limited to this case, and it is obvious that various types of display panels which are driven by a clock signal or a driving signal can be employed.

The touch panel 20 may be placed adjacent to the electronic device 10 and receive a user's touch signal. Referring to FIG. 2, the touch panel 20 may be disposed on the display panel which displays images and receive the user's touch signal. The touch panel 20 which receives the user's touch signal may be implemented in various forms and is not limited to a particular form. For example, the touch panel 20 may have a two-layered structure. Here, a touch sensor may be implemented as an array of pixels formed by a plurality of sense electrode traces (e.g., traces extending in an X-axis direction) and a plurality of drive electrode traces (e.g., traces extending in a Y-axis direction) disposed on the sense electrode traces and intersecting the sense electrode traces. In addition, the touch panel 20 may be implemented as a touch panel having a single layer of touch sensors which lie in the same plane and are manufactured on a single surface of a single layer on a substrate. The drive and sense electrode traces may be manufactured as bar-like shapes extending in a first axis direction and as partitioned electrodes extending in a second axis direction. The bar-like shapes extending in the first axis direction are connected to individual metal wirings within a boundary region of the touch panel 20. Of the partitioned electrodes extending in the second axis direction, the electrodes formed on the same first axis are connected to each other by the individual metal wirings within the boundary region of the touch panel 20. In FIG. 2, the touch panel 20 has a single layer of touch sensors which lie in the same plane and are manufactured on a single surface of a single layer on the substrate. However, this invention is disclosed in Korean Patent Application No. 10-2007-0021332, entitled "Touch Location Sensing Panel Having a Simple Layer Structure," filed on Mar. 5, 2007. The content of the invention is incorporated by reference in the present specification.

The touch sensor chip 30 may transmit a driving signal to the touch panel 20 and receive a sensing signal from the touch panel 20. That is, the touch sensor chip 30 may transmit the driving signal to the drive electrode traces of the touch panel 20 and receive the sense signal from the sense electrode traces of the touch panel 20. The touch sensor chip 30 may determine a user's touch location based on the driving signal transmitted to the touch panel 20 and the sense signal received from the touch panel 20.

The touch sensor chip 30 may be mounted on the touch panel 20 as shown in FIG. 2. The drive electrode traces and the sense electrode traces of the touch panel 20 may lie in the same plane. In some embodiments, the touch sensor chip 30 may be mounted on a circuit board instead of the touch panel 20, and the circuit board on which the touch sensor chip 30 is mounted may be electrically connected to the touch panel 20.

The touch sensor chip 30 may calculate a noise level at each frequency based on the sense signal received from the touch panel 20. To measure the noise level, the touch sensor chip 30 may not transmit the driving signal to the touch panel 20. When the touch sensor chip 30 does not transmit the driving signal to the touch panel 20, the touch panel 20 may sense a signal generated by environmental nose instead of a sense signal generated by a user's touch and may calculate the noise level at a frequency based on the sensed signal. The noise level will be described in more detail later.

When the noise level at a frequency of the driving signal transmitted to the touch panel 20 is equal or higher than a noise threshold, the touch sensor chip 30 may hop the frequency of the driving signal by a hopping interval. The noise threshold is a minimum noise level value used to determine whether noise is present in the touch panel 20. The operation of the touch sensor chip 30 will now be described in more detail with reference to FIGS. 3 through 7.

FIGS. 3 through 7 are graphs illustrating the operation of the touch sensing apparatus 100 shown in FIG. 1. Specifically, FIGS. 3 through 7 are graphs of noise level values at all frequencies. In FIGS. 3 through 7, it is assumed that one electronic device 10, i.e., one LCD panel is placed around the touch panel 20. Accordingly, it is assumed that a noise signal sensed by the touch panel 20 is a noise signal generated by the LCD panel. In addition, it is assumed in FIGS. 3 through 7 that a driving signal or a clock signal transmitted to drive the LCD panel is a sinusoidal signal. A plurality of electronic devices 10 can also be placed around the touch panel 20. In this case, a noise signal sensed by the touch panel 20 may be noise generated by the electronic devices 10. In addition, if driving signals or clock signals transmitted to the electronic devices 10 are all sinusoidal signals, the noise signal sensed by the touch panel 20 may be represented by the sum of these sinusoidal signals. Since the noise signal sensed by the touch panel 20 is the sum of the sinusoidal signals, it may be a signal having periodicity.

Figure 3:
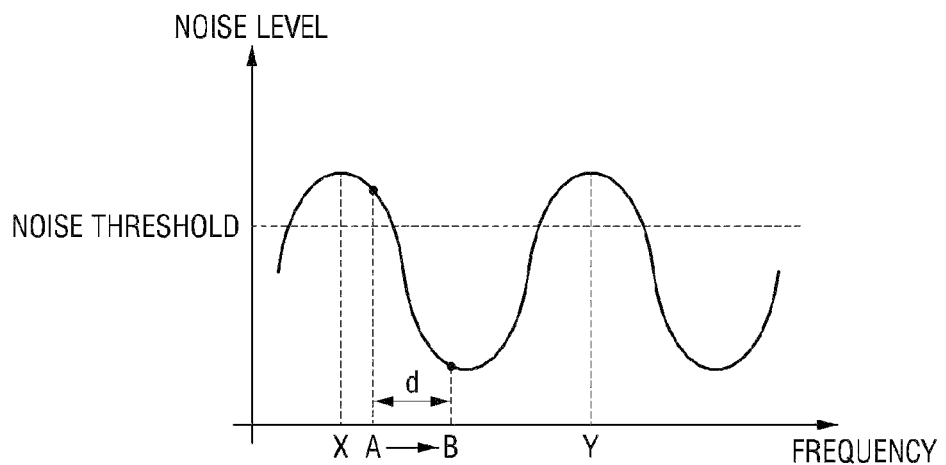
FIGS. 3 through 12 are graphs illustrating the operation of the touch sensing apparatus shown in FIG. 1.

First, referring to FIG. 3, the touch sensor chip 30 may measure a noise level at a frequency generated by the electronic device 10. As described above, it is assumed in FIGS. 3 through 7 that only one electronic device 10 exists. Therefore, the noise level at the frequency may be expressed in the form of one sine wave. In addition, since a noise signal sensed by the touch panel 20 is generated by the electronic device 10, the noise level may have a maximum value at each frequency corresponding to N (N is an integer) times a frequency of a clock signal or a driving signal transmitted to the electronic device 10. For example, if the frequency of the clock signal transmitted to the electronic device 10 (i.e., the LCD panel) is 43 kHZ, the noise level may have the maximum value at frequencies of 43 kHZ (e.g., a frequency of X in FIG. 3), 2×43 kHZ (e.g., a frequency of Y in FIG. 3), etc.

When the noise level at a frequency of the driving signal transmitted to the touch panel 20 is equal to or higher than a noise threshold, the touch sensor chip 30 may hop the frequency of the driving signal by a hopping interval. When the noise level at the frequency of the driving signal transmitted to the touch panel 20 is lower than the noise threshold, the current frequency of the driving signal can be used. Therefore, there is no need to hop the frequency of the driving signal. However, when the noise level at the frequency of the driving signal transmitted to the touch panel 20 is equal to or higher than the noise threshold, it is difficult to use the current frequency of the driving signal. Therefore, the touch sensor chip 30 may hop the frequency of the driving signal by the hopping interval.

In FIG. 3, if the current frequency of the driving signal of the touch panel 20 is a frequency A, since the noise level at the frequency A is higher than the noise threshold, the touch sensor chip 30 may determine to hop the frequency of the driving signal and change the frequency of the driving signal to a frequency B by hopping the frequency of the driving signal by a hopping interval d. At the frequency B to which the frequency of the driving signal was hopped, the noise level is lower than the noise threshold. Therefore, the touch sensor chip 30 may drive the touch panel 20 by using the driving signal having the frequency B. The hopping interval will now be described in more detail with reference to FIG. 4 as well.

Referring to FIG. 3, the hopping interval d is smaller than the frequency of the clock signal or the driving signal which drives the electronic device 10. Therefore, both the frequency A and the frequency B to which the frequency of the driving signal was hopped from the frequency A by the hopping interval d are all located within one period of the noise signal. In addition, since the noise level at the frequency B is lower than the noise threshold, the frequency B can be used.

Figure 4:
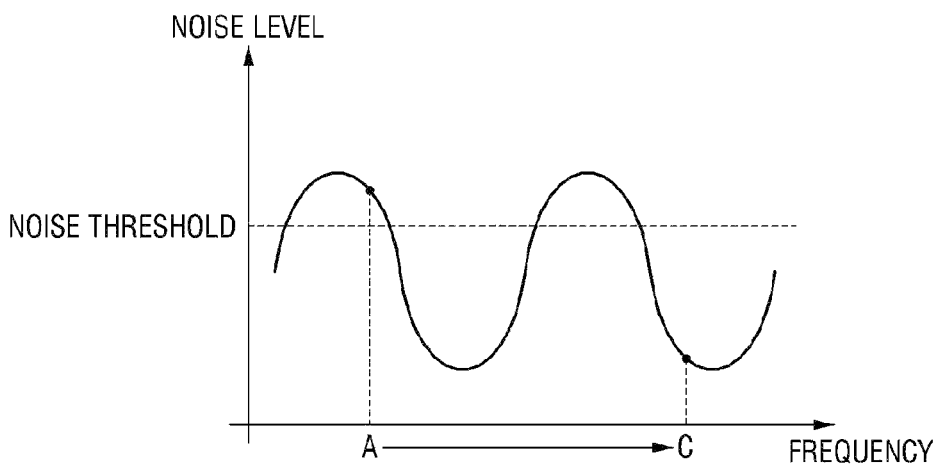

Referring to FIG. 4, the hopping interval is greater than the frequency of the clock signal or the driving signal which drives the electronic device 10. Therefore, both the frequency A and a frequency C to which the frequency of the driving signal was hopped from the frequency A by the hopping interval are not located within one period of the noise signal but have a gap of more than one period between them. In addition, since the noise level at the frequency C is lower than the noise threshold, the frequency C can be used.

In the embodiments of FIGS. 3 and 4, since the noise levels at the frequencies B and C to which the frequency of the driving signal was hopped are lower than the noise threshold, the frequencies B and C can be used. However, if the hopping interval is greater than the frequency of the clock signal or the driving signal of the electronic device 10 as in the embodiment of FIG. 4, a frequency at which the noise level is lower than the noise threshold can be found at a location far away from an initial frequency of the driving signal of the touch panel 20. This is disadvantageous in terms of bandwidth, which, in turn, may cause various disadvantages.

As described above, the noise signal has the maximum value at each frequency corresponding to N (N is an integer) times the frequency of the clock signal or the driving signal of the electronic device 10. Therefore, the clock signal or the driving signal of the electronic device 10 may have at least one noise-free frequency. Hence, when the noise level at the initial frequency of the driving signal of the touch panel 20 is equal to or higher than the noise threshold, a frequency at which the noise level is lower than the noise threshold can be found even if the frequency of the driving signal of the touch panel 20 is hopped slightly from the initial frequency, that is, even if the hopping interval is smaller than the frequency of the clock signal or the driving signal of the electronic device 10 as in the embodiment of FIG. 3. Thus, since the hopping interval is smaller than the frequency of the clock signal or the driving signal of the electronic device 10 in the present invention, the present invention may be advantageous in terms of bandwidth.

The hopping interval may be set based on an exciting frequency of the touch sensor chip 30. Specifically, the hopping interval may be a minimum frequency interval that can be set by the touch sensor chip 30. In some embodiments, the exciting frequency of the touch sensor chip 30 may be in a range of 200 to 1000 kHZ, and the hopping interval which is the minimum frequency interval that can be set by the touch sensor chip 30 may be 1 to 2% of the exciting frequency of the touch sensor chip 30.

The hopping interval may be set variously according to the frequency of the clock signal of the display panel. When the hopping interval is smaller, there may be a lower probability of re-hopping. The hopping interval may be smaller than the frequency of the clock signal of the display panel. Therefore, the hopping interval may be set to 5 to 43 kHZ. In some embodiments, when the exciting frequency of the touch sensor chip 30 is 700 kHZ or higher, the hopping interval may be approximately 10.5 kHZ which is 1.5% of the exciting frequency. However, the exciting frequency of the touch sensor chip 30 may be set variously, and the minimum frequency interval that can be set by the touch sensor chip 30 may be set variously at the time of chip design.

Figure 5:
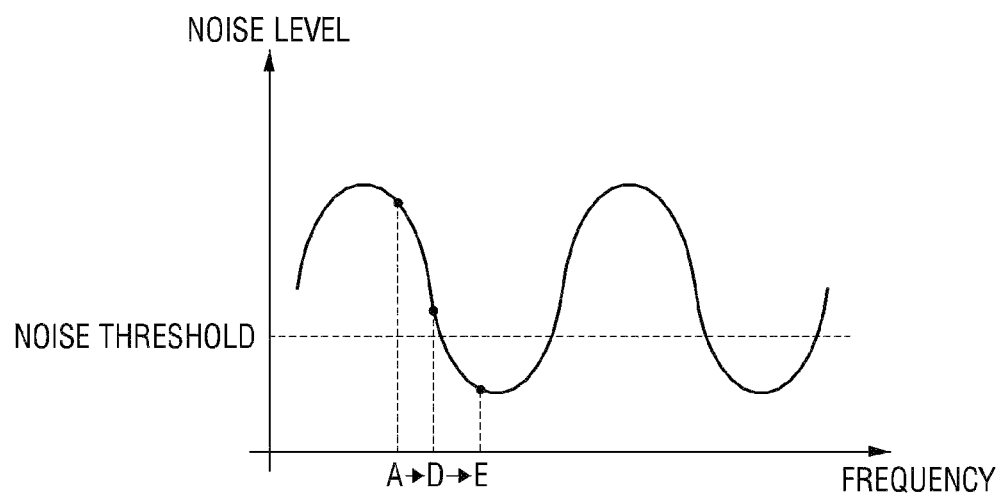

Referring to FIG. 5, when the noise level at a frequency to which the frequency of the driving signal of the touch panel 20 was hopped by the hopping interval is equal to or higher than the noise threshold, the touch sensor chip 30 may re-hop the frequency of the driving signal by the hopping interval. If the initial frequency of the driving signal of the touch panel 20 is the frequency A, since the noise level at the frequency A is higher than the noise threshold, the touch sensor chip 30 may determine to hop the frequency of the driving signal and change the frequency of the driving signal to a frequency D by hopping the frequency of the driving signal by the hopping interval. However, the noise level at the frequency D to which the frequency of the driving signal was hopped is still equal to or higher than the noise threshold. In this case, the touch sensor chip 30 may drive the touch panel 20 at a frequency E by re-hopping the frequency of the driving signal by the hopping interval.

In the above-described hopping pattern, the touch sensor chip 30 may hop the frequency of the driving signal of the touch panel 20 until a frequency at which the noise level is higher than the noise threshold is found. Here, the touch sensor chip 30 may hop the frequency of the driving signal within a range of approximately +10 to −10% of the exciting frequency of the touch sensor chip 30. In this case, since the hopping interval is 1.5% of the exciding frequency of the touch sensor chip 30, the frequency of the driving signal of the touch panel 20 may be hopped approximately six or seven times.

Figure 6:
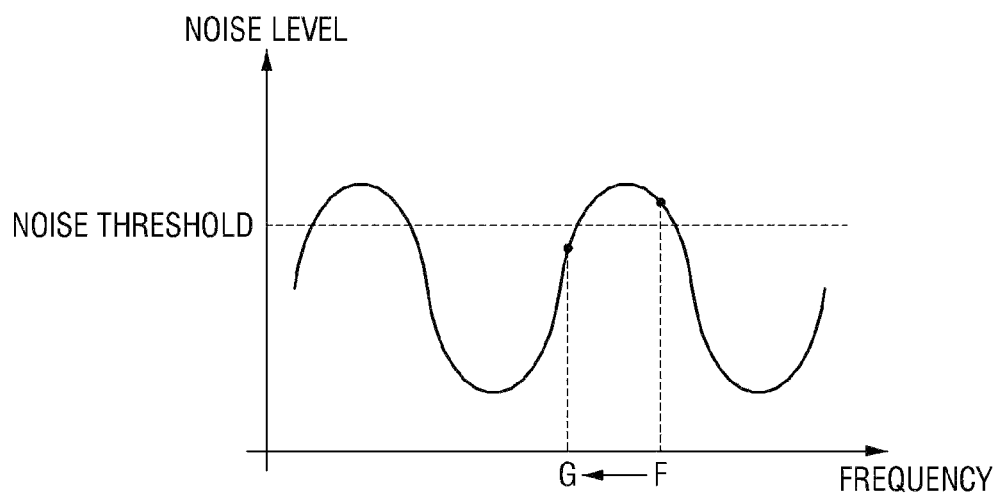

Referring to FIG. 6, the touch sensor chip 30 may hop the frequency of the driving signal of the touch panel 20 in a negative direction. The embodiment of FIG. 6 is substantially the same as the embodiment of FIG. 3, except that the touch sensor chip 30 hops the frequency of the driving signal in the negative direction. That is, since the noise level at an initial frequency F of the driving signal of the touch panel 20 is equal to or higher than the noise threshold, the touch sensor chip 30 may hop the frequency of the driving signal of the touch panel 20 by the hopping interval. In addition, since the noise level at a frequency G to which the frequency of the driving signal was hopped is lower than the noise threshold, the touch sensor chip 30 may drive the touch panel 20 at the frequency G.

Figure 7:
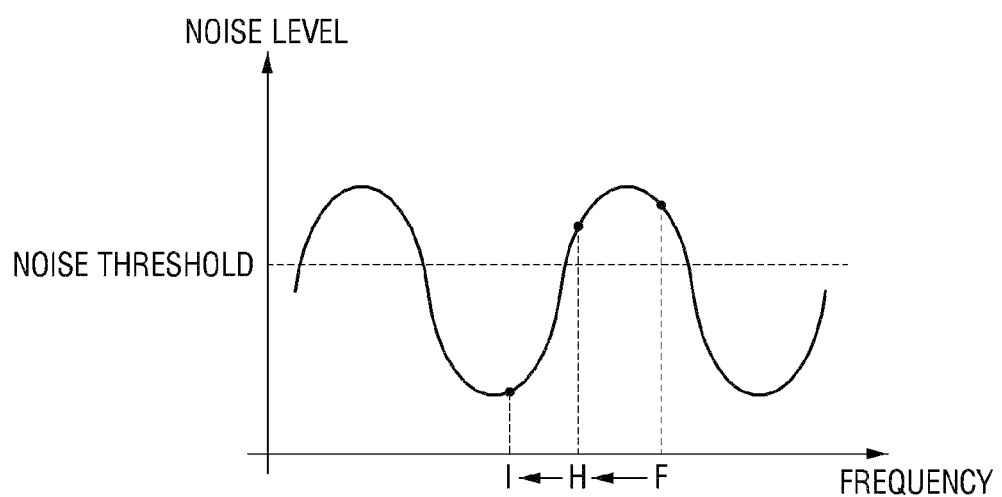

Referring to FIG. 7, the touch sensor chip 30 may hop the frequency of the driving signal of the touch panel 20 in the negative direction. When the noise level at a frequency to which the frequency of the driving signal of the touch panel 20 was hopped by the hopping interval is equal to or higher than the noise threshold, the touch sensor chip 30 may re-hop the frequency of the driving signal by the hopping interval. The embodiment of FIG. 7 is substantially the same as the embodiment of FIG. 5, except that the touch sensor chip 30 hops the frequency of the driving signal in the negative direction. That is, since the noise level at the initial frequency F of the driving signal of the touch panel 20 is equal to or higher than the noise threshold, the touch sensor chip 30 may hop the frequency of the driving signal of the touch panel 20 by the hopping interval. However, since the noise level at a frequency H to which the frequency of the driving signal was hopped is equal to or higher than the noise threshold, the touch sensor chip 30 may determine to perform re-hopping and may re-hop the frequency of the driving signal of the touch panel 20 by the hopping interval. The noise level at a frequency I to which the frequency of the driving signal was re-hoped is lower than the noise threshold. Therefore, the touch sensor chip 30 may drive the touch panel 20 at the frequency I.

The touch sensor chip 30 may hop the frequency of the driving signal of the touch panel 20 in a positive direction as illustrated in FIG. 3 or may hop the frequency of the driving signal of the touch panel 20 in the negative direction as illustrated in FIG. 6. In some embodiments, the direction of frequency hopping may be arbitrarily selected from the positive direction and the negative direction. Alternatively, while frequency hopping is being performed in one of the positive direction and the negative direction, if a limit, that is, a value corresponding to approximately +10 or −10% of the exciting frequency of the touch sensor chip 30 is reached in the selected direction, the touch sensor chip 30 may perform frequency hopping in an opposite direction from the selected direction.

When noise is detected at a frequency of a driving signal currently being used to drive the touch panel 20, the touch sensing apparatus 100 according to the current embodiment may hop the frequency of the driving signal of the touch panel 20 in order to prevent malfunctions. Accordingly, the touch sensing apparatus 100 according to the current embodiment can prevent malfunctions caused by the noise. Further, the touch sensing apparatus 100 according to the current embodiment may set the frequency hopping interval based on the exciting frequency of the touch sensor chip 30 and may set the hopping interval to a value smaller than a frequency of a clock signal of the electronic device 10. Therefore, the touch sensing apparatus 100 can perform frequency hopping with precision, which is advantageous in terms of bandwidth.

When the noise level at a frequency of the driving signal transmitted to the touch panel 20 is equal to or higher than the noise threshold, the touch sensor chip 30 may perform an additional operation in order to determine whether to perform frequency hopping. As described above with reference to FIGS. 3 through 7, when the noise level at the frequency of the driving signal transmitted to the touch panel 20 is equal to or higher than the noise threshold, the touch sensor chip 30 may hop the frequency of the driving signal by the hopping interval. However, there may be a case where the noise level is equal to or higher than the noise threshold even if an actual touch did not occur. For example, a user's body part such as a finger may be placed close to (e.g., hover above) the touch panel 20 without touching the touch panel 20. In this case, although the touch panel 20 was not actually touched, the noise level can be equal to or higher than the noise threshold. However, since this is not a case where the frequency of the driving signal must be hopped, the touch sensor chip 30 may perform an additional operation in order to determine whether to perform frequency hopping. The operation of the touch sensor chip 30 will now be described in more detail with reference to FIGS. 8 through 12.

FIGS. 8 through 12 are graphs illustrating the operation of the touch sensing apparatus 100 shown in FIG. 1. Specifically, FIGS. 8 through 12 are graphs of time versus noise level value and touch input signal value at a frequency of a driving signal of the touch panel 20. More specifically, (a) in FIGS. 8 through 12 is a graph illustrating the noise level value with respect to time, and (b) in FIGS. 8 through 12 is a graph illustrating the touch input signal value with respect to time. A noise threshold in FIGS. 8 through 12 is substantially equal to the noise threshold in FIGS. 3 through 7, and a touch threshold in FIGS. 8 through 12 is a minimum touch input signal value used to determine the occurrence of a user's touch on the touch panel 20.

Figure 8:
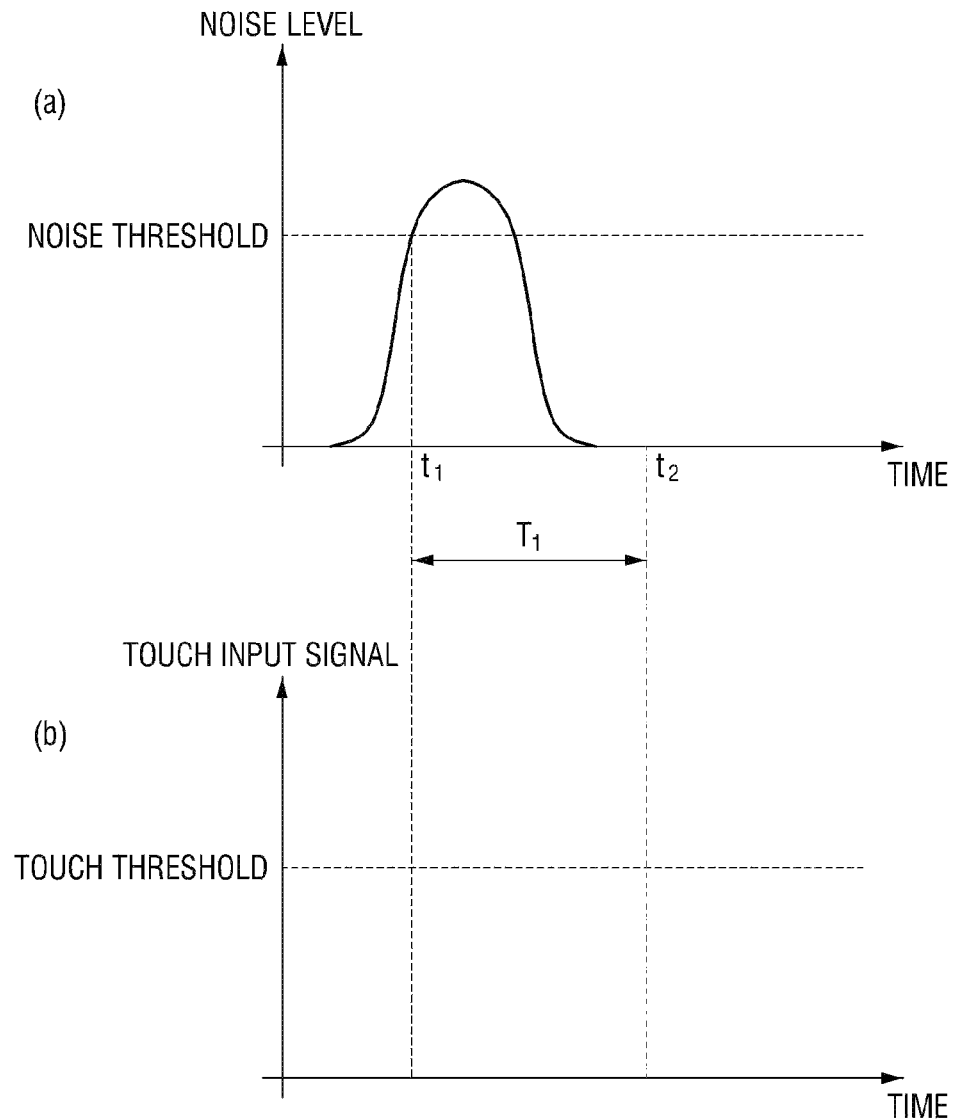

The touch sensor chip 30 may detect whether a touch on the touch panel 20 occurs during a first time period from a time when a noise level becomes equal to or higher than the noise threshold. Referring to FIG. 8, the touch sensor chip 30 may detect whether a touch on the touch panel 20 occurs during a first time period $T_1$ from a time $t_1$ when a noise level at a frequency of a driving signal of the touch panel 20 becomes equal to or higher than the noise threshold. In the embodiment of FIG. 8, a touch does not occur during the first time period $T_1$ from the time $t_1$ when the noise level becomes equal to or higher than the noise threshold. Therefore, the corresponding noise may be determined to be noise generated due to, e.g., hovering, and the touch sensor chip 30 may not hop the frequency of the driving signal of the touch panel 20. In some embodiments, the first time period $T_1$ may be a time period corresponding to 15 to 45 frames used for display, that is, a time period during which 15 to 45 frames are displayed. In some embodiments, the first time period $T_1$ may be a time period corresponding to 30 frames used for display, that is, a time period during which 30 frames are displayed.

Figure 9:
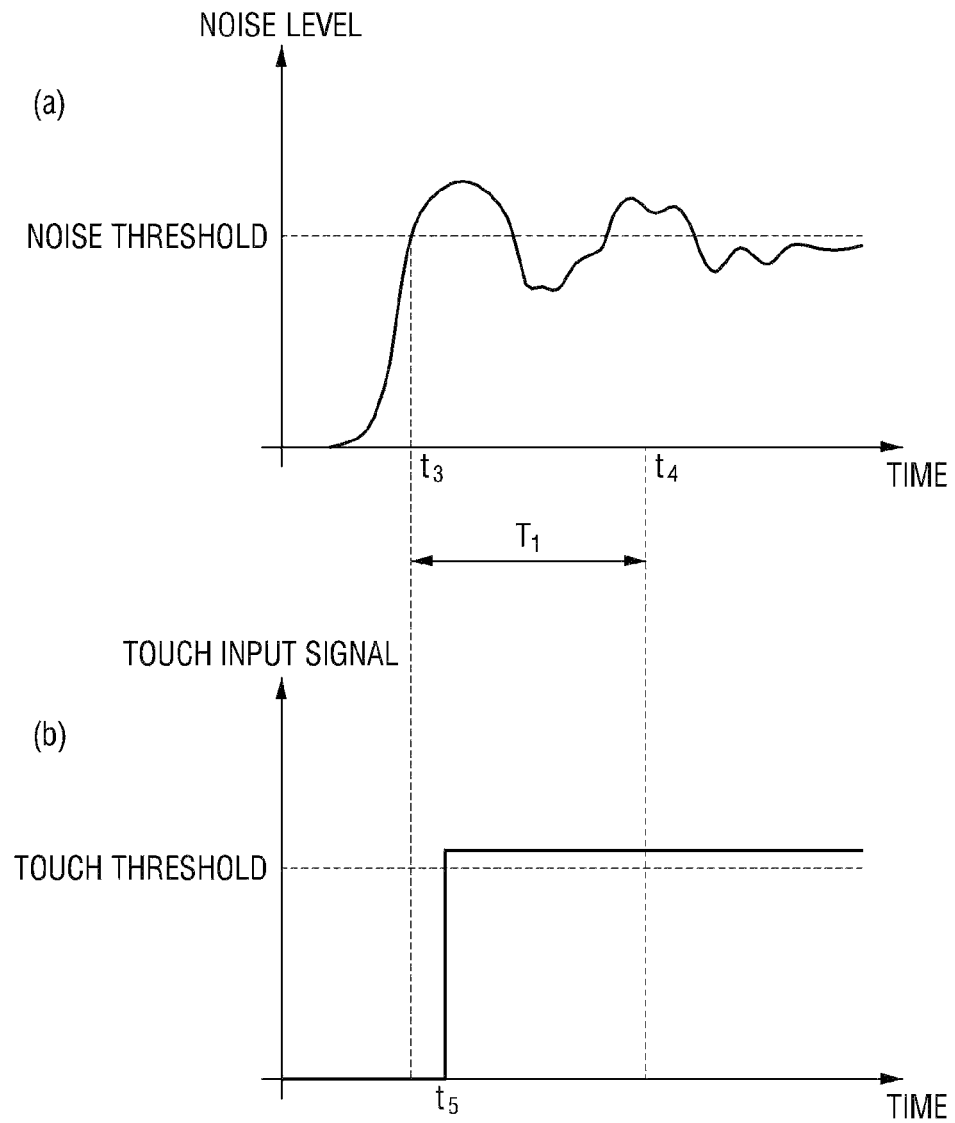

Referring to FIG. 9, the touch sensor chip 30 may detect whether a touch on the touch panel 20 occurs during the first time period $T_1$ from a time $t_3$ when the noise level at the frequency of the driving signal of the touch panel 20 becomes equal to or higher than the noise threshold. In the embodiment of FIG. 9, a touch occurs at a time $t_5$ during the first time period $T_1$ from the time $t_3$ when the noise level at the frequency of the driving signal of the touch panel 20 becomes equal to or higher than the noise threshold. Therefore, the corresponding noise may be determined to be related to an actual touch, and the touch sensor chip 30 may hop the frequency of the driving signal of the touch panel 20 by the hopping interval. The specific hopping operation of the touch sensor chip 30 is the same as the hopping operation described above with reference to FIGS. 3 through 7.

Figure 10:
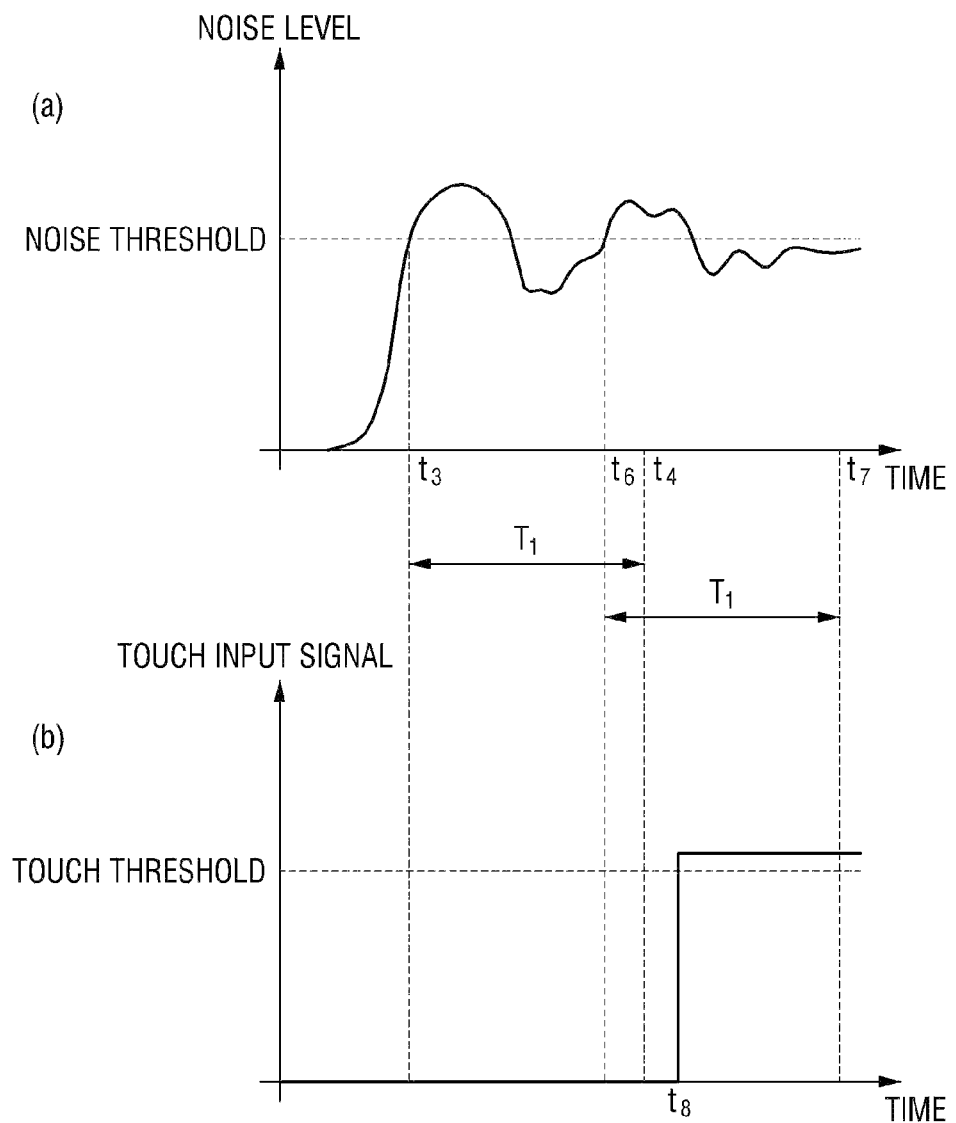

Referring to FIG. 10, the touch sensor chip 30 may detect whether a touch on the touch panel 20 occurs during the first time period $T_1$ from the time $t_3$ when the noise level at the frequency of the driving signal of the touch panel 20 becomes equal to or higher than the noise threshold. Independently of this, the touch sensor chip 30 may also detect whether a touch on the touch panel 20 occurs during the first time period $T_1$ from a time $t_6$ when the noise level at the frequency of the driving signal of the touch panel 20 becomes equal to or higher than the noise threshold. In the embodiment of FIG. 10, a touch does not occur during the first time period $T_1$ from the time $t_3$ when the noise level becomes equal to or higher than the noise threshold. Therefore, the corresponding noise may be determined to be noise generated due to, e.g., hovering, and the touch sensor chip 30 may not hop the frequency of the driving signal of the touch panel 20. However, a touch occurs at a time $t_8$ during the first time period $T_1$ from the time $t_6$ when the noise level at the frequency of the driving signal of the touch panel 20 becomes equal to or higher than the noise threshold. Therefore, the corresponding noise may be determined to be related to an actual touch, and the touch sensor chip 30 may hop the frequency of the driving signal of the touch panel 20 by the hopping interval. The specific hopping operation of the touch sensor chip 30 is the same as the hopping operation described above with reference to FIGS. 3 through 7.

Even after a time $t_a$ when a user's touch is released, noise generated by the user's touch may still remain for a certain time period, and the level of the noise may be equal to higher than the noise threshold. That is, even if the user's touch is released, the user's body part such as a finger can be placed adjacent to the touch panel 20 when the user's body is away from the touch panel 20. Therefore, although an actual touch on the touch panel 20 did not occur, there may a case where the noise level becomes equal to or higher than the noise threshold due to, e.g., hovering. Therefore, since this is not a case where the frequency of the driving signal must be hopped, the touch sensor chip 30 may not hop the frequency of the driving signal during a specific time period from the time when the touch on the touch panel is released.

Figure 11:
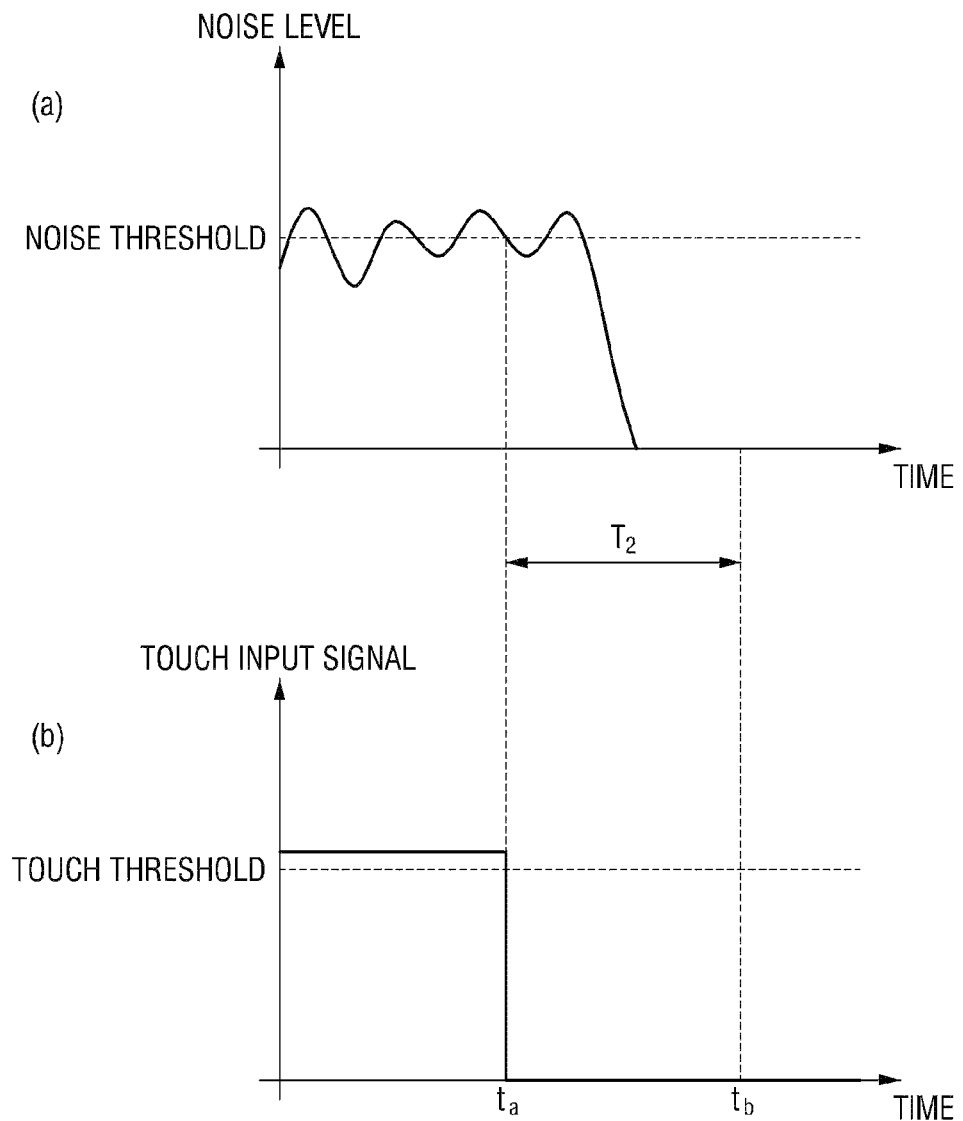

Referring to FIG. 11, during a second time period $T_2$ from the time $t_a$ when the touch on the touch panel 20 is released, the touch sensor chip 30 may detect whether the noise level is equal to or higher than the noise threshold and whether a touch on the touch panel 20 occurs. In the embodiment of FIG. 11, there are moments when the noise level becomes equal to or higher than the noise threshold during the second time period $T_2$ from the time $t_a$ when the touch on the touch panel 20 is released. However, since the possibility is high that the corresponding noise is occurred when the touch on the touch panel 20 is released, the touch sensor chip 30 may not hop the frequency of the driving signal during the second time period $T_2$ from the time $t_a$ when the touch on the touch panel 20 is released. In some embodiments, the second time period $T_2$ may be a time period corresponding to 15 to 45 frames used for display, that is, a time period during which 15 to 45 frames are displayed. In some embodiments, the second time period $T_2$ may be a time period corresponding to 30 frames used for display, that is, a time period during which 30 frames are displayed.

Figure 12:
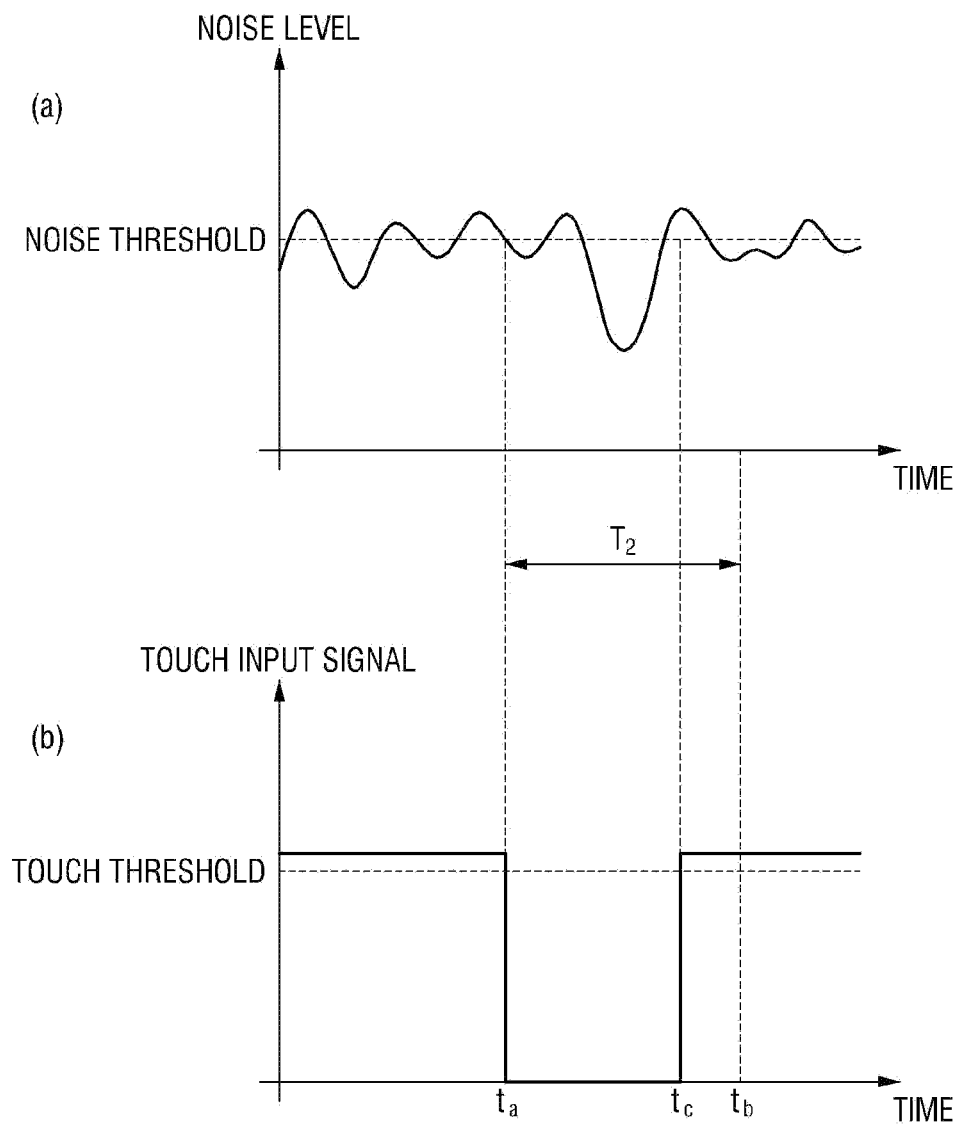

Referring to FIG. 12, during the second time period $T_2$ from the time $t_a$ when the touch on the touch panel 20 is released, the touch sensor chip 30 may detect whether the noise level is equal to or higher than the noise threshold and whether a touch occurs on the touch panel 20. In the embodiment of FIG. 12, there are moments when the noise level becomes equal to or higher than the noise threshold during the second time period $T_2$ from the time $t_a$ when the touch on the touch panel 20 is released. In addition, a touch on the touch panel 20 occurs at a time $t_c$. Regardless of the time tc, the touch sensor chip 30 may not hop the frequency of the driving signal during the second time period T2 from the time ta when the touch on the touch panel 20 is released.

Figure 13:
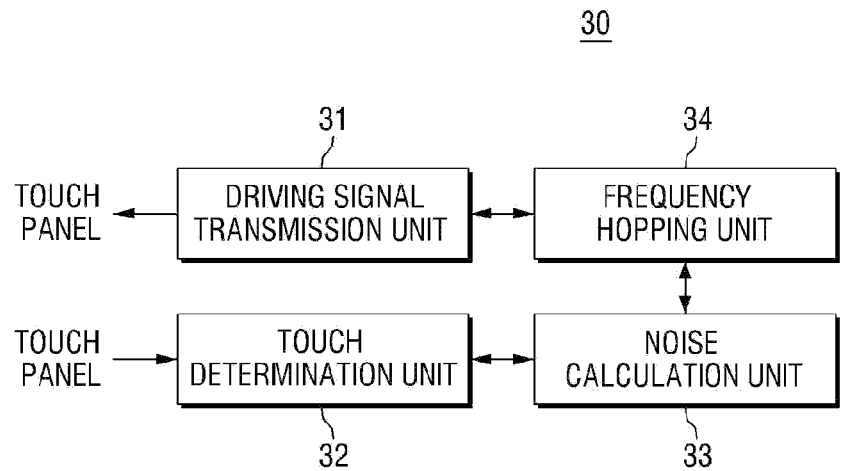
FIG. 13 is a schematic diagram illustrating a touch sensor chip according to an embodiment of the present invention.

FIG. 13 is a schematic diagram illustrating a touch sensor chip 30 according to an embodiment of the present invention. Referring to FIG. 13, the touch sensor chip 30 may include a driving signal transmission unit 31, a touch determination unit 32, a noise calculation unit 33, and a frequency hopping unit 34.

The driving signal transmission unit 31 may transmit a driving signal to a touch panel which operates in connection with the touch sensor chip 30. The touch panel may be substantially the same as the touch panel 20 described above with reference to FIGS. 1 through 12. The driving signal transmission unit 31 may transmit a driving signal having an initially set frequency to the touch panel.

The touch determination unit 32 may determine the occurrence of a touch and the location of the touch based on a touch signal received from the touch panel. Using the touch signal generated when a user applies a touch input to the touch panel, the touch sensor chip 30 may determine the occurrence of a touch and the location of the touch.

The noise calculation unit 33 may calculate a noise level at a frequency based on the touch signal. Calculating the noise level at the frequency by using the noise calculation unit 33 is substantially the same as calculating the noise level at the frequency by using the touch sensor chip 30 described above with reference to FIGS. 1 through 12, and thus a repetitive description thereof will be omitted.

Noise whose level is calculated by the noise calculation unit 33 may be generated by an electronic device outside the touch sensor chip 30. Here, the electronic device outside the touch sensor chip 30 may be any electronic device other than the touch sensor chip 30 and may be placed around the touch sensor chip 30. Therefore, the external electronic device may be a display panel such as an LCD panel as described above with reference to FIGS. 1 through 12 or may be a device which is placed around the touch panel operated by the touch sensor chip 30 and generates an electromagnetic wave in response to a clock signal or a driving signal.

When the noise level at a frequency of a driving signal of the touch panel is equal to or higher than a noise threshold, the frequency hopping unit 34 may hop the frequency of the driving signal by a hopping interval, wherein the hopping interval may be set based on an exciting frequency of the touch sensor chip 30. Hopping the frequency of the driving signal of the touch panel by using the frequency hopping unit 34 is substantially the same as hopping the frequency of the driving signal of the touch panel by using the touch sensor chip 30 described above with reference to FIGS. 1 through 12, and thus a repetitive description thereof will be omitted.

Figure 14:
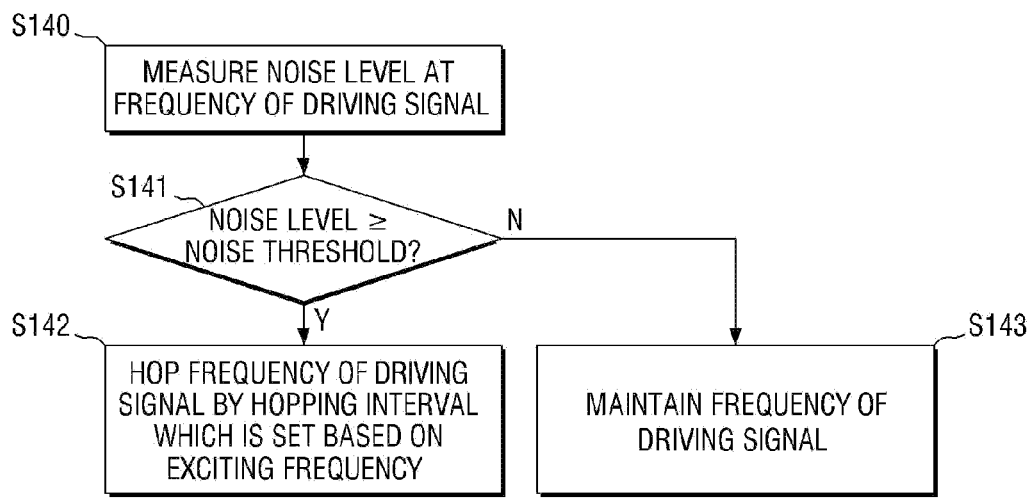
FIG. 14 is a flowchart illustrating a method of controlling noise of a touch panel according to an embodiment of the present invention.

FIG. 14 is a flowchart illustrating a method of controlling noise of a touch panel according to an embodiment of the present invention.

Referring to FIG. 14, a noise level at a frequency of a driving signal of a touch panel is measured (operation S140). The measuring of the noise level at the frequency of the driving signal of the touch panel is substantially the same as calculating the noise level at the frequency by using the touch sensor chip 30 in FIGS. 1 through 12, and thus a repetitive description thereof will be omitted.

The measuring of the noise level at the frequency of the driving signal of the touch panel may include measuring the noise level at the frequency of the driving signal which drives the touch panel in a state where the driving signal is not transmitted to the touch panel. When the driving signal is not transmitted to the touch panel, the touch panel may sense a signal generated by environmental noise instead of a sensing signal generated by a user's touch and may calculate the noise level at the frequency based on the sensed signal. Therefore, the method of controlling noise of the touch panel according to the current embodiment may be a method of controlling environmental noise of the touch panel.

It is determined whether the noise level is equal to or higher than a noise threshold (operation S141). When it is determined that the noise level is not equal to or higher than the noise threshold, the driving frequency of the touch panel may be maintained (operation S143).

However, when it is determined that the noise level is equal to or higher than the noise threshold (operation S141), the frequency of the driving signal is hopped by a hopping interval which is set based on an exciting frequency of a touch sensor chip (operation S142). The hopping of the frequency of the driving signal based on the hopping interval which is set based on the exciting frequency of the touch sensor chip is substantially the same as hopping the frequency of the driving signal of the touch panel by using the touch sensor chip 30 in FIGS. 1 through 12, and thus a repetitive description thereof will be omitted.

In some embodiments, if a touch on the touch panel occurs during a first time period from a time when the noise level becomes equal to or higher than the noise threshold, the frequency of the driving signal is hopped by the hopping interval. On the other hand, if a touch on the touch panel does not occur during the first time period from the time when the noise level becomes equal to or higher than the noise threshold, the frequency of the driving signal may not be hopped. In some embodiments, if the noise level is equal to or higher than the noise threshold and if a touch occurs during a second time period from a time when a touch on the touch panel is released, the frequency of the driving signal may be hopped by the hopping interval. On the other hand, the frequency of the driving signal may not be hopped during the second time period from the time when the touch on the touch panel is released. Determining whether to perform frequency hopping based on whether a touch occurs during the first time period, the second time period and a corresponding time period is substantially the same as hopping the frequency of the driving signal of the touch panel by using the touch sensor chip 30 in FIGS. 1 through 12, and thus a repetitive description thereof will be omitted.

Embodiments of the present invention provide at least one of the following advantages.

That is, a touch sensor chip which can prevent malfunctions caused by noise, a touch sensing apparatus including the touch sensor chip, and a method of controlling noise of a touch panel can be provided.

Furthermore, a touch sensor chip which can vary a driving frequency of a touch panel according to a frequency of noise that occurs around the touch panel, a touch sensing apparatus including the touch sensor chip, and a method of controlling noise of the touch panel can be provided.

However, the effects of the present invention are not restricted to the one set forth herein. The above and other effects of the present invention will become more apparent to one of daily skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A touch sensing apparatus comprising:
an electronic device which is driven by a clock signal;
a touch panel which is placed adjacent to the electronic device and receives a touch signal; and
a touch sensor chip which calculates a noise level at the frequency of a driving signal and transmits the driving signal to the touch panel and hops a frequency of the driving signal by a hopping interval if the noise level at the frequency of the driving signal is equal to or higher than a noise threshold,
wherein the hopping interval is set based on an exciting frequency of the touch sensor chip,
wherein the hopping interval is smaller than a frequency of the clock signal of the electronic device;
wherein a first frequency of the driving signal before a hopping and a second frequency of the driving signal after the hopping are located within one period of a noise signal,
wherein the touch sensor chip selects a direction of either a positive direction or a negative direction and performs frequency hopping by the hopping interval in the selected direction,
wherein the touch sensor chip performs the frequency hopping in the other direction from the selected direction, if a predetermined limit is reached in the selected direction and if the noise level is above the noise threshold.

2. The touch sensing apparatus of claim 1, wherein the noise level is the magnitude of noise measured in a state where the driving signal is not transmitted to the touch panel.

3. The touch sensing apparatus of claim 2, wherein the electronic device is a display panel, and the touch panel is placed on a surface of the display panel.

4. The touch sensing apparatus of claim 1, wherein the hopping interval is 5 to 43 kHz.

5. The touch sensing apparatus of claim 1, wherein the hopping interval is a minimum frequency interval that can be set by the touch sensor chip.

6. The touch sensing apparatus of claim 5, wherein the exciting frequency of the touch sensor chip is 200 to 1000 kHz, and the hopping interval is 1 to 2% of the exciting frequency of the touch sensor chip.

7. The touch sensing apparatus of claim 5, wherein if the noise level at a frequency to which the frequency of the driving signal was hopped by the hopping interval is equal to or higher than the noise threshold, the touch sensor chip re-hops the frequency of the driving signal by the hopping interval.

8. The touch sensing apparatus of claim 7, wherein the touch sensor chip re-hops the frequency of the driving signal within a range of +10 to −10% of the exciting frequency of the touch sensor chip.

9. The touch sensing apparatus of claim 1, wherein the touch sensor chip does not hop the frequency of the driving signal if a touch on the touch panel occurs during a first time period from a time when the noise level becomes equal to or higher than the noise threshold and hops the frequency of the driving signal by the hopping interval if a touch on the touch panel does not occur during the first time period from the time when the noise level becomes equal to or higher than the noise threshold.

10. The touch sensing apparatus of claim 1, wherein the touch sensor chip does not hop the frequency of the driving signal during a second time period from the time when the touch on the touch panel is released.

11. The touch sensing apparatus of claim 10, wherein the each of the first time period and the second time period is a time period corresponding to 15 to 45 frames.

12. A touch sensor chip comprising:
a driving signal transmission unit which transmits a driving signal to a touch panel;
a touch determination unit which determines the occurrence of a touch and the location of the touch based on a touch signal received from the touch panel; and
a noise calculation unit which calculates a noise level at the frequency of the driving signal based on the touch signal; and
a frequency hopping unit which hops a frequency of the driving signal if the noise level at the frequency of the driving signal is equal to or higher than a noise threshold,
wherein the hopping interval is set based on an exciting frequency of the touch sensor chip,
wherein the hopping interval is smaller than a frequency of the clock signal of an electronic device which is placed adjacent to the touch panel;
wherein a first frequency of the driving signal before a hopping and a second frequency of the driving signal after the hopping are located within one period of a noise signal,
wherein the frequency hopping unit selects a direction of either a positive direction or a negative direction and performs frequency hopping by the hopping interval in the selected direction,
wherein the frequency hopping unit performs the frequency hopping in the other direction from the selected direction, if a predetermined limit is reached in the selected direction and if the noise level is above the noise threshold.

13. The touch sensor chip of claim 12, wherein noise is generated by an electronic device outside the touch sensor chip, and the noise level is the magnitude of noise measured in a state where the driving signal is not transmitted to the touch panel.

14. The touch sensor chip of claim 12, wherein the hopping interval is a minimum frequency interval that can be set by the touch sensor chip.

15. The touch sensor chip of claim 14, wherein the hopping interval is 1 to 2% of the exciting frequency of the touch sensor chip, and the exciting frequency of the touch sensor chip is 200 to 1000 kHz.

16. The touch sensor chip of claim 14, wherein the frequency hopping unit re-hops the frequency of the driving signal if the noise level at a frequency to which the frequency of the driving signal was hopped by the hopping interval is equal to or higher than the noise threshold.

17. The touch sensor chip of claim 16, wherein the frequency hopping unit re-hops the frequency of the driving signal within a range of +10 to −10% of the exciting frequency of the touch sensor chip.

18. The touch sensor chip of claim 12, wherein the frequency hopping unit does not hop the frequency of the driving signal if a touch on the touch panel occurs during a first time period from a time when the noise level becomes equal to or higher than the noise threshold and hops the frequency of the driving signal by the hopping interval if a touch on the touch panel does not occur during the first time period from the time when the noise level becomes equal to or higher than the noise threshold.

19. The touch sensor chip of claim 12, wherein the frequency hopping unit does not hop the frequency during a second time period from the time when the touch on the touch panel is released.

20. A method of controlling noise of a touch panel, the method comprising:
measuring a noise level at a frequency of a driving signal of a touch panel; and
hopping the frequency of the driving signal by a hopping interval which is set based on an exciting frequency of a touch sensor chip if the noise level is equal to or higher than a noise threshold,
wherein the hopping interval is smaller than a frequency of a clock signal of an electronic device which is placed adjacent to the touch panel;
wherein a first frequency of the driving signal before a frequency hopping and a second frequency of the driving signal after the frequency hopping are located within one period of a noise signal,
wherein the hopping selects a direction of either a positive direction or a negative direction and performs frequency hopping by the hopping interval in the selected direction,
wherein the hopping performs the frequency hopping in the other direction from the selected direction, if a predetermined limit is reached in the selected direction and if the noise level is above the noise threshold.

21. The method of claim 20, wherein the measuring of the noise level comprises measuring the noise level at the frequency of the driving signal in a state where the driving signal is not transmitted to the touch panel.

22. The method of claim 20, further comprising:
not hopping the frequency of the driving signal if a touch on the touch panel occurs during a first time period from a time when the noise level becomes equal to or higher than the noise threshold; and
hopping the frequency of the driving signal by the hopping interval if a touch on the touch panel does not occur during the first time period from the time when the noise level becomes equal to or higher than the noise threshold.

23. The method of claim 20, further comprising:
not hopping the frequency of the driving signal during a second time period from the time when the touch on the touch panel is released.

* * * * *